United States Patent
Biguenet et al.

(10) Patent No.: US 8,377,199 B2
(45) Date of Patent: Feb. 19, 2013

(54) GYPSUM BASED COMPOSITIONS

(75) Inventors: Cedric Biguenet, Leicestershire (GB); Sam O'Keefe, Leicestershire (GB); Agnès Smith, Limoges cedex (FR); Thierry Chotard, Limoges cedex (FR)

(73) Assignee: BPB Limited, Coventry (GB)

( * ) Notice: Subject to any disclaimer, the term of this patent is extended or adjusted under 35 U.S.C. 154(b) by 181 days.

(21) Appl. No.: 12/598,184

(22) PCT Filed: Apr. 11, 2008

(86) PCT No.: PCT/GB2008/050255
§ 371 (c)(1), (2), (4) Date: Aug. 2, 2010

(87) PCT Pub. No.: WO2008/132497
PCT Pub. Date: Nov. 6, 2008

(65) Prior Publication Data
US 2010/0288415 A1 Nov. 18, 2010

(30) Foreign Application Priority Data
May 1, 2007 (GB) .................................. 0708382.7

(51) Int. Cl.
C04B 11/00 (2006.01)
(52) U.S. Cl. ........... 106/772; 423/555; 428/703; 156/39
(58) Field of Classification Search ................. 106/772; 423/555; 428/703; 156/39
See application file for complete search history.

(56) References Cited

U.S. PATENT DOCUMENTS

| | | | |
|---|---|---|---|
| 1,370,581 A | 3/1921 | Brookby | |
| 1,960,538 A | 5/1934 | Hoggatt | |
| 1,972,888 A | 9/1934 | Hansen | |
| 2,067,762 A | 1/1937 | Hoggatt | |
| 2,616,789 A | 11/1952 | Hoggatt | |
| 3,356,979 A | 12/1967 | Bouyoucos | |
| 3,898,316 A | 8/1975 | Flood et al. | |
| 4,029,512 A | 6/1977 | Jaunarajs et al. | |
| 6,352,585 B1 * | 3/2002 | Diesso | 106/35 |

(Continued)

FOREIGN PATENT DOCUMENTS

| | | |
|---|---|---|
| DE | 2310799 | 9/1973 |
| GB | 695234 | 8/1953 |

(Continued)

OTHER PUBLICATIONS

"Ullmann's Encyclopedia of Industrial Chemistry: Aluminum compounds, Inorganic; vol. A, 5th rev. edition" 1985, VCH Verlagsgesellschaft, Weinheim; Deerfield Beach, Florida.

*Primary Examiner* — Paul Marcantoni
(74) *Attorney, Agent, or Firm* — GrayRobinson, P.A.; Michael J. Colitz, III

(57) ABSTRACT

A gypsum stucco composition comprising the following components finely divided; calcium sulphate hemihydrate in calcined solid beta crystalline form; and in intimate mixture with said finely divided calcium sulphate hemihydrate and mixed therewith no later than calcination to form the hemihydrate, a sulphate salt comprising at least one of ammonium sulphate and aluminium sulphate, in an amount such that when the stucco composition is mixed with water and allowed to set, the resulting set plaster has increased compressive strength, flexural strength and/or E-modulus compared to a set plaster produced from said finely divided calcium sulphate hemihydrate containing no said sulphate salt.

15 Claims, 4 Drawing Sheets

U.S. PATENT DOCUMENTS

Figure 1:
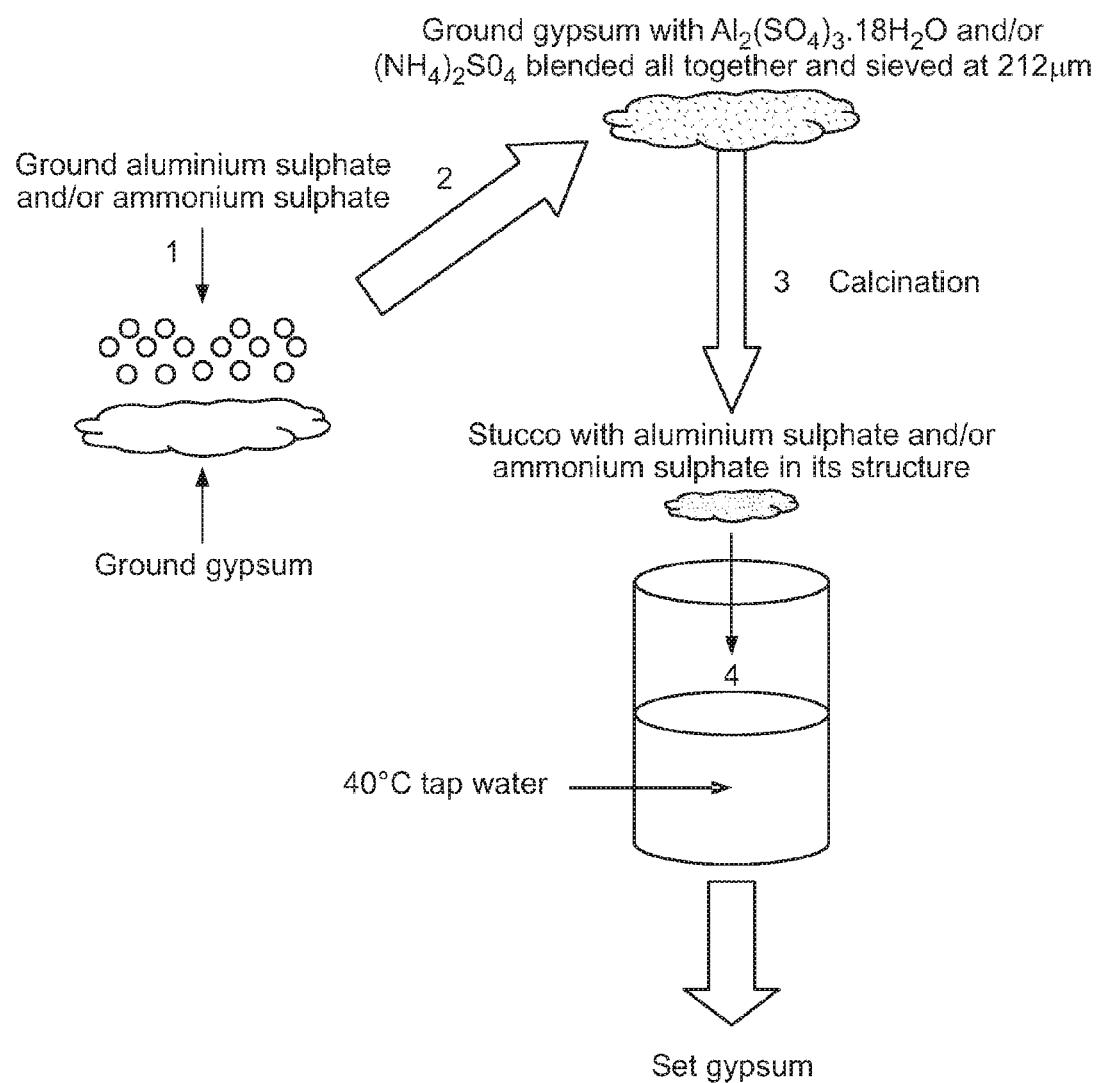

| | | | |
|---|---|---|---|
| 6,379,458 B1 * | 4/2002 | Immordino et al. | 106/772 |
| 6,616,753 B2 * | 9/2003 | Reddy et al. | 106/718 |
| 6,652,825 B2 * | 11/2003 | Sethuraman et al. | 423/555 |
| 6,695,901 B2 * | 2/2004 | Diesso | 106/35 |
| 7,637,995 B2 * | 12/2009 | Bowe et al. | 106/772 |
| 8,088,218 B2 * | 1/2012 | Blackburn et al. | 106/772 |
| 2002/0164281 A1 * | 11/2002 | Sethuraman et al. | 423/555 |
| 2005/0161853 A1 | 7/2005 | Miller et al. | |
| 2008/0057206 A1 * | 3/2008 | Igo et al. | 427/403 |
| 2011/0024028 A1 * | 2/2011 | Immordino et al. | 156/244.11 |

FOREIGN PATENT DOCUMENTS

| | | |
|---|---|---|
| GB | 2062601 A | 5/1981 |
| GB | 2086869 | 5/1982 |

\* cited by examiner

GYPSUM BASED COMPOSITIONS

PRIORITY DATA

This application is a continuation of and claims priority under 35 U.S.C. §371 to International Application No. PCT/GB2008/050255 filed on Apr. 11, 2008, which claim priority from GB 0708382.7 filed on May 1, 2007. The contents of both aforementioned applications are incorporated herein by reference.

The present invention concerns gypsum-based compositions which can be used to form plaster products.

Gypsum is a naturally occurring form of calcium sulphate, in the form of a stable dihydrate ($CaSO_4$ $2H_2O$). The term "gypsum", as used herein, means calcium sulphate in that stable dihydrate state; and includes the naturally occurring mineral, the synthetically derived equivalents, and the dihydrate material formed by the hydration of stucco (calcium sulphate hemihydrate) or anhydrite.

The properties of gypsum make it highly suitable for use in industrial and building plasters and other building products such as gypsum wallboard. It is a plentiful and generally inexpensive raw material which, through successive steps of dehydration and rehydration, can be cast, moulded or otherwise formed to useful shapes. For example, gypsum wallboard; also known as plasterboard or drywall, is formed as a set gypsum core sandwiched between paper cover sheets.

Gypsum is generally prepared for use as plaster by grinding and calcining at relatively low temperature (such as from about 120 to 170° C.), generally at atmospheric pressure. This results in partially dehydrated gypsum, typically in the form of the beta crystalline form of the hemihydrate, which generally has an irregular crystal structure. The beta hemihydrate may be used as a building or construction material by mixing it with water to form an aqueous stucco slurry, paste or dispersion, and then allowing the slurry to set by recrystallisation from the aqueous medium. Such setting is typically rapid in the production of plasterboard (typically within 2.5 to 10 minutes).

Gypsum is inherently a brittle, crystalline material which has relatively low tensile, compression and flexural strength. There have been many attempts to improve one or more of these properties.

We have now found that the addition of certain sulphate salts to gypsum prior to calcination can result in significantly improved compression strength in products made from the resulting formulation.

The present invention relates to the use of at least one of ammonium sulphate and aluminium sulphate and potassium aluminium sulphate and ammonium aluminium sulphate for enhancing the compressive strength of gypsum building board.

The present invention therefore provides a gypsum stucco composition comprising the following components
i) finely divided calcium sulphate hemihydrate, in calcined solid beta crystalline form; and
ii) in intimate mixture with the finely divided calcium sulphate hemihydrate, and mixed therewith no later than calcination thereof, a sulphate salt comprising ammonium and/or aluminium sulphate and/or potassium aluminium sulphate and/or ammonium aluminium sulphate, in an amount such that when the stucco composition is mixed with water the resulting mix has reduced water demand and/or viscosity, and/or such that when the mix is allowed to set, the resulting set plaster has increased compressive strength compared to a set plaster produced from the finely divided calcium sulphate hemihydrate containing no such sulphate salt.

The intimate mixture is achieved according to the invention by mixing gypsum with ammonium and/or aluminium sulphate no later than calcination thereof (that is, prior to or during calcination of the gypsum to calcium sulphate hemihydrate).

The finely divided calcium sulphate hemihydrate used in the composition according to the invention has generally been obtained by gypsum calcination. If the original source of the gypsum is natural, it may be crushed and ground before converting to the hemihydrate; if it is derived from an industrial source, drying may be all that is required before conversion to the hemihydrate. It is even possible in some cases to omit the drying step when using a process known as wet calcination.

The finely divided calcium sulphate hemihydrate used in the composition according to the invention preferably is such that it has a $d_{10}$ value of no more than 3 microns and/or a $d_{90}$ of no less than 100 microns. (A $d_{10}$ value of no more than 3 microns means that no more than 10% by weight of the solids has a particle size of less than 3 microns; similarly a $d_{90}$ value of no less than 100 microns means that no more than 10% by weight of the solids has a particle size of greater than 100 microns.)

It is, of course, known to use aluminium sulphate as an accelerator in the production of gypsum plaster; the amount used for acceleration purposes would have significantly less effect on compressive strength than is achieved according to the invention. Furthermore, in the manufacture of plasterboard, accelerators are added just prior to the step of mixing with water, in order to provide control over the addition rates and therefore the set time, whereas the sulphate used according to the present invention is in an intimately mixture with the stucco. In some embodiments, this can be with the composition in substantially dry form, prior to being mixed with water to produce an aqueous slurry or the like.

When aluminium sulphate is employed in the composition according to the invention, it is preferably present in an amount of 1 to 6 grams per 100 grams of hydratable calcium sulphate (about 0.5 to 3 molar percent, based on the number of moles of hydratable calcium sulphate). When ammonium sulphate is present, it is preferably in an amount of 0.2 to 0.4 grams per 100 grams of hydratable calcium sulphate. (about 0.5 to 1 molar percent, based on the number of moles of hydratable calcium sulphate). When ammonium aluminium sulphate is present, it is preferably in an amount of 0.6 to 4 grams per 100 grams of hydratable calcium sulphate (about 0.5 to 1 molar percent, based on the number of moles of hydratable calcium sulphate). When potassium aluminium sulphate is present, it is preferably in an amount of 0.6 to 4 grams per 100 grams of hydratable calcium sulphate. (about 0.5 to 1 molar percent, based on the number of moles of hydratable calcium sulphate).

When aluminium sulphate and/or ammonium sulphate and/or potassium aluminium sulphate and/or ammonium aluminium sulphate are used, they are typically in amounts such that the total molar percentage of the ammonium sulphate plus aluminium sulphate plus the ammonium aluminium sulphate plus the potassium aluminium sulphate is at least 0.5 molar percent, typically up to 3 molar percent, based on the number of moles of hydratable calcium sulphate.

The composition according to the invention is preferably substantially free of ingredients (other than the essential calcium sulphate) which are capable of independently interacting with the water (thus the composition should contain no more than trace amounts of materials such as clays, cements, gels, water-swellable polymers or the like).

In use, the stucco composition according to the invention is to be mixed with water to form a slurry, paste or dispersion which is allowed to set. It has been found surprisingly that the slurry is less viscous than a comparable slurry containing no aluminium sulphate and/or ammonium sulphate and/or ammonium aluminium sulphate and/or potassium aluminium sulphate. The water employed to make the slurry is typically ground water or tap water, which may have been filtered.

At least some of the water may be in the form of a pre-generated aqueous foam, such as is conventionally added to gypsum slurries so as to reduce the weight of the resulting final board. Various types of foaming agent may be used in such a foam; amongst these are ionic surfactants and non-ionic surfactants.

Other non-deleterious materials, adjuvants and ingredients may, when appropriate, be present either in the water or mixed with the stucco composition. Such non-deleterious materials may include optional further ingredients, such as starch, water reducing agents, moisture repellents (such as silicone oils or waxes), reinforcing fibres, set accelerators and retarders, deformation inhibitors (such as anti-sagging agents), anti-shrink additives, recalcination inhibitors, foam stabilisers, bactericides, fungicides, pH adjusters, colouring agents, fire retardants and fillers (such as particulate mineral material or plastics, which may in some embodiments be in expanded form).

The pH of the slurry, paste or dispersion formed from the stucco composition according to the invention is typically in the range 6.5 to 9.5.

Especially when the composition according to the invention is used in the production of gypsum board, the aqueous slurry, paste or dispersion made therefrom may contain fibre reinforcement, such as glass fibres (typically cut fibres).

When gypsum board is produced from the composition according to the invention, the board may be with or without surface reinforcement or liner sheets; when surface reinforcement is used, it may, for example, be of fibre scrim, fibre mesh or paper.

The present invention extends to gypsum building board comprising a set aqueous gypsum slurry, paste or dispersion derived from a composition according to the invention, and the use of a formulation according to the invention in the production of such gypsum building board.

Certain preferred aspects and features of the present invention are illustrated by way of example only with reference to the accompanying drawings, in which.

FIG. 1 shows an embodiment in which ground gypsum was powder blended with ground aluminium sulphate (namely $Al_2(SO_4)_3.18H_2O$) and/or ammonium sulphate and/or ammonium aluminium sulphate and/or potassium aluminium sulphate. The resulting powder blend was then calcined to produce stucco having aluminium sulphate and/or ammonium sulphate and/or ammonium aluminium sulphate and/or potassium aluminium sulphate mixed therewith and uniformly dispersed throughout the stucco.

Figure 2:
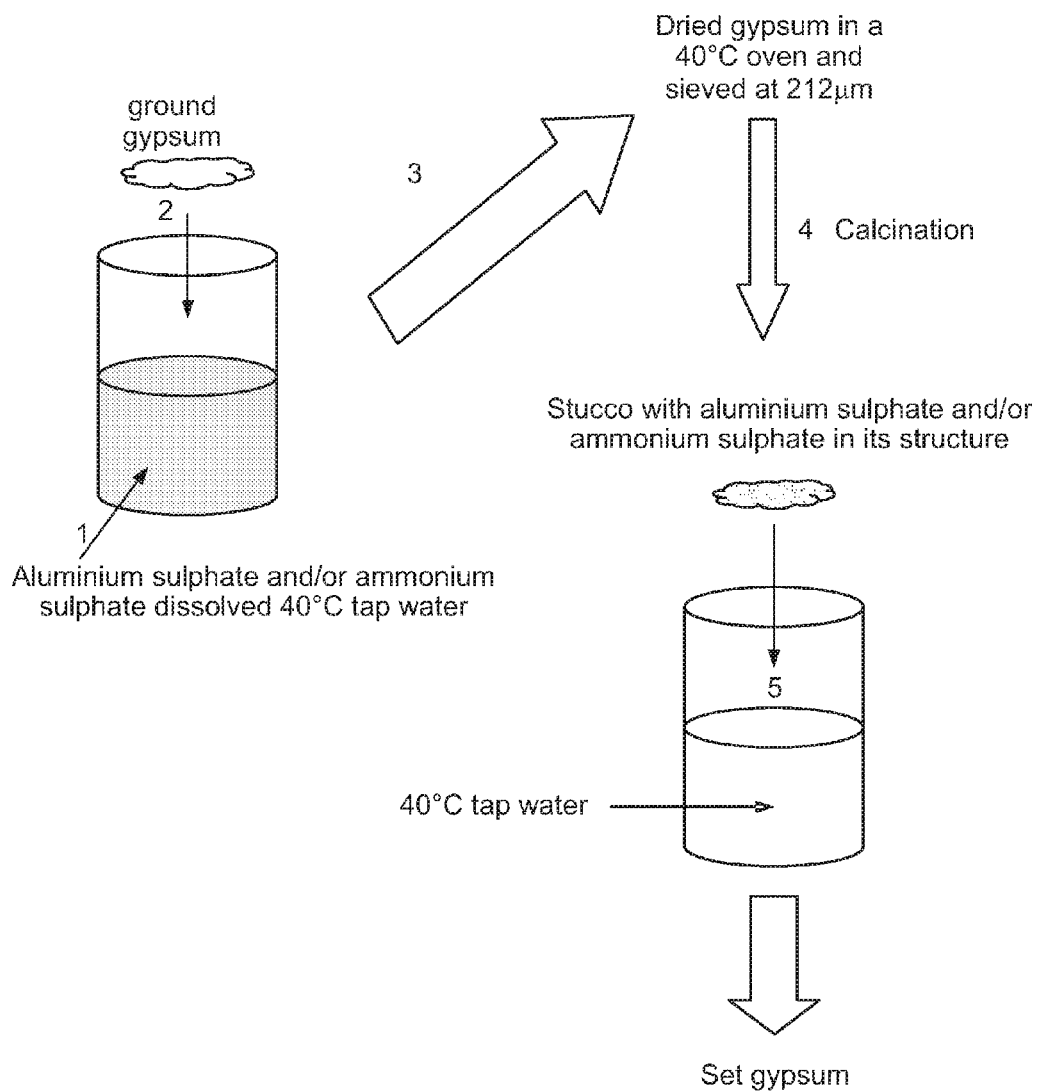

FIG. 2 shows an embodiment in which ground gypsum was blended with an aqueous solution of aluminium sulphate and/or ammonium sulphate and/or ammonium aluminium sulphate and/or potassium aluminium sulphate. The resulting aqueous mix was then dried and calcined to produce stucco having aluminium sulphate and/or ammonium sulphate and/or ammonium aluminium sulphate and/or potassium aluminium sulphate intimately mixed therewith and uniformly dispersed throughout the stucco.

Figure 3:
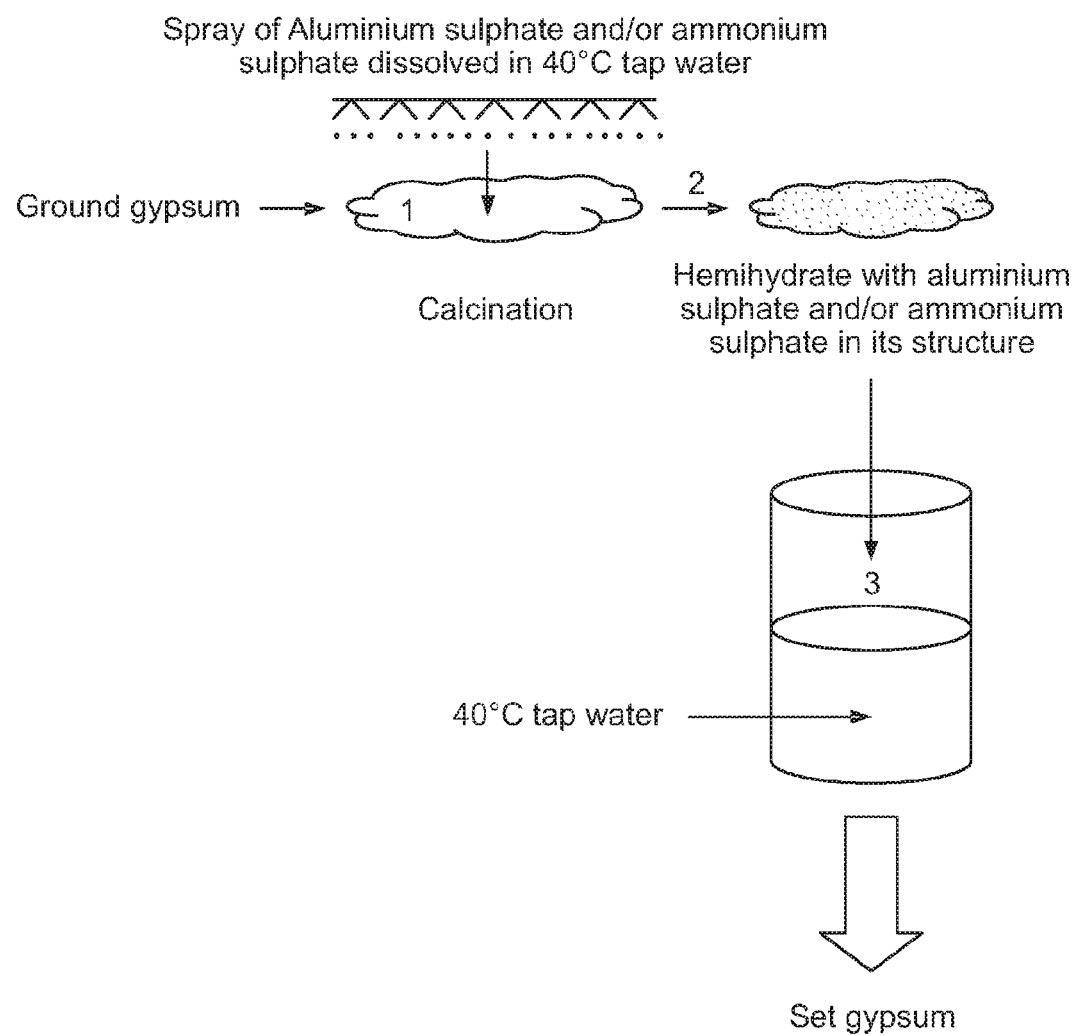

FIG. 3 shows an embodiment in which ground gypsum was sprayed with an aqueous solution of aluminium sulphate and/or ammonium sulphate and/or ammonium aluminium sulphate and/or potassium aluminium sulphate. The resulting sprayed product was then calcined to produce stucco having aluminium sulphate and/or ammonium sulphate and/or ammonium aluminium sulphate and/or potassium aluminium sulphate intimately mixed therewith and uniformly dispersed throughout the stucco.

Figure 4:
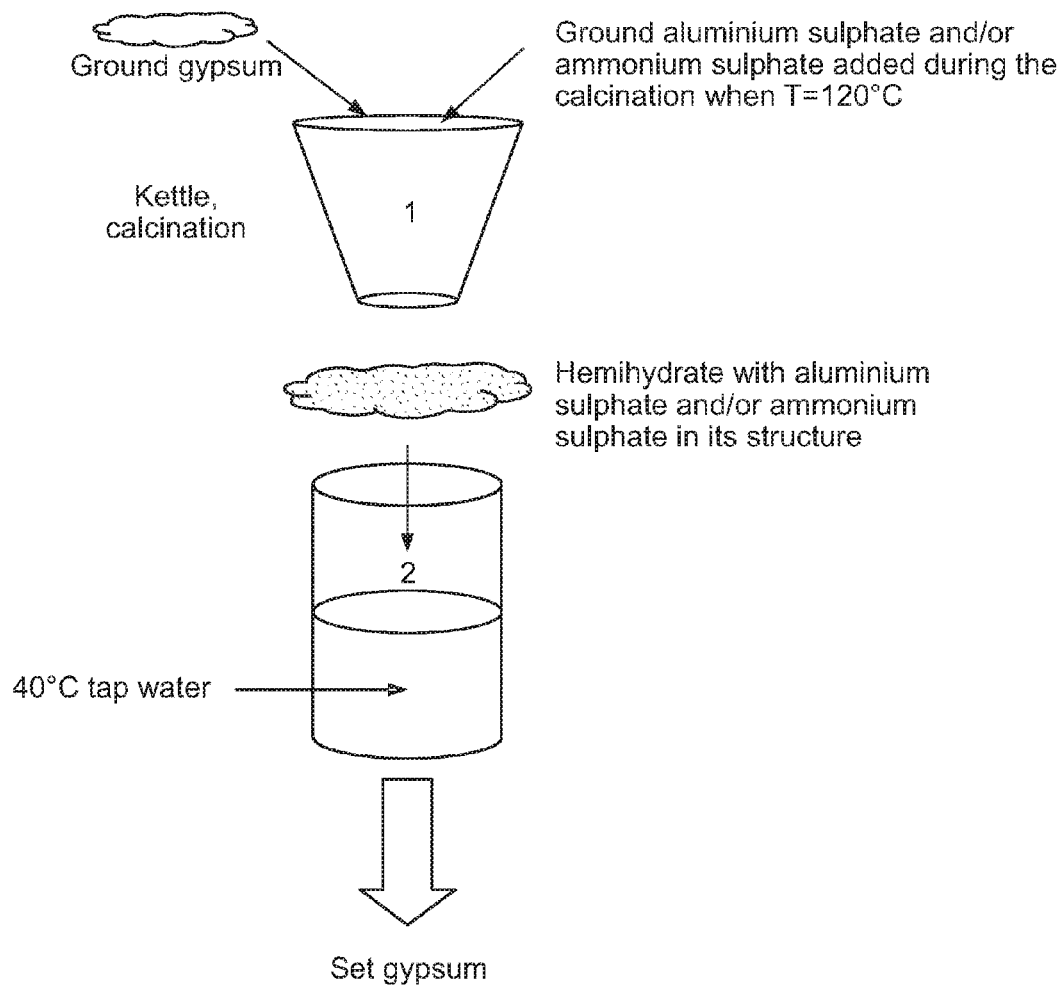

FIG. 4 shows an embodiment in which ground gypsum was blended with an aqueous solution of aluminium sulphate and/or ammonium sulphate and/or ammonium aluminium sulphate and/or potassium aluminium sulphate in a kettle and the resulting aqueous mix was directly calcined to produce stucco having aluminium sulphate and/or ammonium sulphate and/or ammonium aluminium sulphate and/or potassium aluminium sulphate intimately mixed therewith and uniformly dispersed throughout the stucco.

In all the illustrated embodiments, ammonium sulphate, aluminium sulphate, ammonium aluminium sulphate and potassium aluminium sulphate may be used together, or separately.

In all the above cases, the stucco was then blended with water (deionised water is shown in each of the drawings) in the usual way, to form a gypsum slurry which can then be allowed to set. The set gypsum slurry may be a conventional form of building material, for example, a plasterboard.

Certain features of the present invention will now be illustrated with reference to the following examples.

EXAMPLES

Aluminium sulphate ($Al_2(SO_4)_3.18H_2O$) was dissolved in deionised water and stucco (calcium sulphate hemihydrate) from natural gypsum was added to the aqueous solution so as to hydrate the stucco and thereby produce gypsum intimately mixed with aluminium sulphate. The molar of aluminium sulphate in the aqueous solution to stucco was about 1:100.

This mix was then dried and subsequently ground (with a hammer mill) and the resulting powder was calcined in a 5 kg batch kettle to produce a modified stucco (now incorporating the aluminium sulphate). This modified stucco was hydrated with agitation in deionised or tap water and the resulting slurry poured into silicon moulds in the shape of cylinders measuring 24 mm of diameter and 48 mm of height. The slurry was then allowed to set. The resultant cylinders were then dried to constant weight at about 40° C. for about 24 hours then conditioned at 23° C./50% RH for at least 24 hours. The compressive strength of the cylinders, as well as their densities, were measured.

The slurry poured into the moulds was more fluid (less viscous) than a control batch containing no aluminium sulphate. The control slurry had a Vicat Initial Set (VIS) of 27 min, and a Vicat Final Set (VFS) of 30 min 30 sec; the corresponding figures for the slurry containing aluminium sulphate were VIS=5 min 20 sec, VFS=6 min 30 sec.

The compressive strength of the resulting cylinders were +22.6% greater than that of the control; and even +56% greater than that of the addition of aluminium sulphate added after the calcination as a process water.

The experiment (following the procedure illustrated in accompanying FIG. 1) was repeated using a range of inorganic compounds other than aluminium sulphate, namely ammonium sulphate, ferrous sulphate, magnesium sulphate, potassium sulphate, sodium sulphate and strontium sulphate, potassium carbonate, ammonium chloride, zinc sulphate potassium aluminium sulphate, ammonium aluminium sulphate, molybdic acid, vanadium oxide sulphate, tungstosilicic acid hydrate. The results are summarised in the following table, which shows that the greatest increases in compressive strength were achieved with the addition of ammonium sulphate, while the greatest decreases in water demand were achieved with the addition of potassium aluminium sulphate (with regard to strength increase).

Although the abovementioned illustrative example illustrates use of the compositions according to the invention in plaster blocks (prisms), comparable advantages can be obtained if a slurry made from the composition is sandwiched between opposed surface reinforcement or liner sheets to form a plasterboard. The present invention therefore extends to plasterboard made from the composition according to the

| Trials with some additives blended as a solid before calcination (Water Gauge of 100 and 1 mole % added) | | | | | | | |
|---|---|---|---|---|---|---|---|
| | | Mass added (g) | Water Demand (%) | VIS (min:sec) | VFS (min:sec) | Slurry consistency | Dry density (kg/m$^3$) | Compressive strength (Mpa) |
| Aluminium sulphate | $Al_2(SO_4)_3 \cdot 18H_2O$ | 96.86 | 81 | 4:40 | 6:20 | Fluid | 855 | 6.5 |
| Ammonium sulphate | $(NH_4)_2 SO_4$ | 19.21 | 85 | 5:05 | 6:05 | Fluid | 853 | 7.6 |
| | | | | | | | 862 | 7.4 |
| Iron sulphate | $FeSO_4 \cdot 7H_2O$ | 80.83 | 100 | 4:30 | 5:40 | Viscous | 859 | 6.4 |
| | | | | | | | 864 | 5.9 |
| Magnesium sulphate | $MgSO_4 \cdot 7H_2O$ | 71.65 | 90 | 8:35 | 9:50 | less viscous | 863 | 6.8 |
| | | | | | | | 865 | 6.3 |
| Potassium sulphate | $K_2SO_4$ | 25.33 | 98 | 4:10 | 5:25 | Viscous | 858 | 6.2 |
| | | | | | | | 860 | 4.8 |
| Sodium sulphate | $Na_2SO_4 \cdot 10H_2O$ | 46.83 | 90 | 6:35 | 7:20 | less viscous | 864 | 6.2 |
| | | | | | | | 863 | 5.8 |
| Strontium sulphate | $SrSO_4$ | 53.11 | 95 | 8:05 | 9:35 | Viscous | 853 | 5.7 |
| | | | | | | | 869 | 6.1 |
| Potassium aluminium sulphate | $KAl(SO_4)_2 \cdot 12H_2O$ | 68.95 | 70 | 5:40 | 7:10 | very watery | 897 | 7.37 |
| | | | | | | | 872 | 7.62 |
| | | | | | | | 863 | 7.31 |
| Ammonium aluminium sulphate | $NH_4Al(SO_4)_2 \cdot 12H_2O$ | 65.89 | 76 | 7:00 | 8:45 | Watery | 860 | 7.27 |
| | | | | | | | 870 | 6.88 |
| Zinc sulphate | $ZnSO_4 \cdot 7H_2O$ | 83.59 | 80 | 8:00 | 9:30 | Fluid | 869 | 6.36 |
| Molybdic acid | $MoO_3$ | 74.96 | 69 | 6:35 | 8:35 | very watery | 872 | 6.98 |
| | | | | | | | 868 | 6.67 |
| Potassium carbonate | $K_2CO_3$ | 20.09 | 90 | 8:35 | 9:10 | Less viscous | 847 | 5.76 |
| | | | | | | | 843 | 5.71 |
| Ammonium chloride | $NH_4Cl$ | 15.55 | 61 | 6:00 | 7:25 | Very watery | 868 | 3.62 |
| | | | | | | | 866 | 3.53 |
| Vanadium oxide sulphate | $VOSO_4 \cdot H_2O$ | 47.38 | 88 | 5:45 | 7:35 | Less viscous | 858 | 6.68 |
| | | | | | | | 857 | 6.11 |
| Tungstosilicic acid hydrate | $H_4[Si(W_3O_{10})_4] \cdot H_2O$ | 69.73 | 88 | 10:50 | 13:05 | Less viscous | 866 | 5.51 |
| | | | | | | | 863 | 4.80 |

The table also shows that ammonium sulphate offers the additional advantage that significant increases in compressive strength are achieved with a lower weight of additive. For example, the table compares results achieved with 19.21 grams of ammonium sulphate compared to 96.86 grams of aluminium sulphate. Although ammonium sulphate is slightly more expensive per tonne than aluminium sulphate (in 2005 £86 per tonne compared to £71 per tonne) the ability to use a smaller quantity means that ammonium sulphate can achieve comparable results to aluminium sulphate at about a quarter of the cost.

Further results showed that when ammonium sulphate was added before calcination, the average compressive strength achieved was 7.5 MPa whereas when it was added after calcination, the average compressive strength was only 5.3 MPa at a given density. Thus the process according to the invention resulted in an average 29% increase in compressive strength.

The use of aluminium sulphate and/or ammonium sulphate and/or ammonium aluminium sulphate and/or potassium aluminium sulphate according to the invention allows higher mechanical performance to be achieved compared to the absence of such sulphates or the use of apparently similar sulphates. Also the slurries containing aluminium sulphate and/or ammonium sulphate and/or ammonium aluminium sulphate and/or potassium aluminium sulphate are less viscous—potentially leading to commercially significant reductions in the amount of water needed.

invention. The plasterboard is generally made by feeding an aqueous slurry (such as a foamed slurry) formed using the composition according to the invention between spaced surface reinforcements so as to form a sandwich structure, and then allowing the slurry to set between the surface reinforcements.

The invention claimed is:

1. A method of preparing a gypsum stucco composition comprising finely divided calcium sulphate hemihydrate in calcined solid beta crystalline form, the method comprising mixing calcium sulphate with at least one sulphate selected from the group consisting of ammonium sulphate, aluminium sulphate, potassium aluminium sulphate and ammonium aluminium sulphate and calcining the mixture.

2. A method according to claim 1, wherein said aluminium sulphate is present in an amount of 0.5 to 3 molar percent, based on the number of moles of said calcium sulphate.

3. A method according to claim 1, wherein said aluminium sulphate is present in an amount of 0.5 to 3 molar percent, based on the number of moles of said calcium sulphate.

4. A method according to claim 1, wherein said ammonium sulphate is present in an amount of 0.2 to 1.2 grams per 100 grams of said calcium sulphate.

5. A method according to claim 1, wherein said ammonium sulphate is present in an amount of 0.5 to 3 molar percent, based on the number of moles of said calcium sulphate.

6. A method according to claim 1, wherein said ammonium aluminium sulphate is present in an amount of 0.6 to 4 grams per 100 grams of said calcium sulphate.

7. A method according to claim 1, wherein said ammonium aluminium sulphate is present in an amount of 0.5 to 3 molar percent, based on the number of moles of said calcium sulphate.

8. A method according to claim 1, wherein said potassium aluminium sulphate is present in an amount of 0.6 to 4 grams per 100 grams of said calcium sulphate.

9. A method according to claim 1, wherein said potassium aluminium sulphate is present in an amount of 0.5 to 3 molar percent, based on the number of moles of said calcium sulphate.

10. A method according to claim 1, wherein the composition is free of materials other than the calcium sulphate which are capable of independently interacting with water.

11. A method according to claim 1, further comprising the step of mixing the composition with water to form a slurry and allowing the slurry to set.

12. A method according to claim 11, wherein the slurry is fed between spaced surface reinforcements so as to form a sandwich structure and the slurry is allowed to set between the surface reinforcements.

13. A method according to claim 11, wherein the slurry contains fiber reinforcements.

14. A method according to claim 11, wherein the slurry is foamed.

15. Plaster for gypsum building board when produced by a method according to claim 11.

\* \* \* \* \*